United States Patent
Miller

(10) Patent No.: US 6,498,626 B1
(45) Date of Patent: Dec. 24, 2002

(54) VIDEO SIGNAL PROCESSING ARRANGEMENT FOR SCAN VELOCITY MODULATION CIRCUIT

(75) Inventor: Rick Wayne Miller, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/320,346

(22) Filed: May 26, 1999

(51) Int. Cl.$^7$ ............................................. H04N 5/21
(52) U.S. Cl. ..................................... 348/626; 348/625
(58) Field of Search ............................. 348/626, 625, 348/704; 315/370; H04N 5/21

(56) References Cited

U.S. PATENT DOCUMENTS

| | | | |
|---|---|---|---|
| 4,309,725 A | 1/1982 | Groeneweg | 358/242 |
| 4,402,013 A | 8/1983 | Wargo | |
| 5,072,300 A | 12/1991 | Anderson | 358/242 |
| 5,179,320 A | 1/1993 | Tripod | 315/399 |
| 5,196,941 A | 3/1993 | Altmanshofer | 358/242 |
| 5,341,071 A | 8/1994 | George | |
| 5,351,094 A | 9/1994 | Washino | 348/626 |
| 5,420,645 A | 5/1995 | Traa et al. | 348/626 |
| 5,444,500 A | 8/1995 | Ten Pierick | 348/807 |
| 5,528,312 A | 6/1996 | No et al. | |
| 5,587,745 A | 12/1996 | Griepentrog et al. | 348/626 |
| 5,600,381 A | 2/1997 | Griepentrog | 348/626 |

FOREIGN PATENT DOCUMENTS

| | | | |
|---|---|---|---|
| EP | 0469567 | 7/1991 | |
| EP | 0472121 | 8/1991 | |
| EP | 0689347 | 6/1995 | |
| EP | 0784402 | 1/1997 | |
| JP | 61099467 | 5/1986 | |
| JP | 63123275 | 5/1988 | |
| JP | 6217160 | 1/1993 | |
| JP | 62254576 | 4/1996 | |
| JP | 331404 | 12/1996 | H04N/3/18 |

OTHER PUBLICATIONS

Patent Abstracts of Japan vol. 102, No. 168 (E–611) May 20, 1988 & JP 62 279783 (Mitsubishi Electric Corp.) Dec. 4, 1991.

Patent Abstracts of Japan vol. 015, No. 157 (E–1058) Apr. 19, 1991 & JP 03 029570 (Mitsubishi Electric Corp.) Feb. 7, 1991.

Toshiba TA1276AN PAL/NTSC Video Chroma and Deflection IC for CTV (Normal Scan/Double Scan Mode).

1988 Mitsubishi Electric Sales America, Inc., Best of the Expander Scan Velocity Modulation—Making I 'Crisp' Around the Edges'.

Ser. No. 320,334 Filed May 26, 1999 Inventor: Rick W. Miller Title:Piece–Wise Linearized Waveform Generator for Scan Velocity Modulation Circiut (RCA 89,239).

Ser. No. 320,481 Filed May 26, 1999 Inventor: Rick W. Miller Title: Scan Velocity Modulation Circuit with Multi— Mode Operations (RCA 89,514).

*Primary Examiner*—Sherrie Hsia
(74) *Attorney, Agent, or Firm*—Joseph S. Tripoli; Harvey D. Fried; Sammy S. Henig

(57) ABSTRACT

A video display deflection circuit includes a source of a video signal for displaying picture information contained in the video signal in a screen of a cathode ray tube. The video signal on-provides selectively an on-screen-display information and a non-screen-display information. A source of a first control signal has a first value, when the video signal provides on-screen-display information and a second value, when said video signal provides non- on-screen-display information. A comb filter responsive to the first control signal has selectively a first delay element, when the first control signal is at the first value and a second delay element, when the first control signal is at the second value. The filter selectively establishes, in accordance with the first value, a first frequency response characteristic and, in accordance with the second value, a second frequency response characteristic. The filter is responsive to a video signal for generating from the video signal a filtered correction signal having a frequency spectrum in accordance with the values of the first control signal. The correction signal is coupled to an auxiliary deflection winding to produce, in accordance therewith, scan velocity modulated deflection of the electron beam.

16 Claims, 3 Drawing Sheets

VIDEO SIGNAL PROCESSING ARRANGEMENT FOR SCAN VELOCITY MODULATION CIRCUIT

The invention relates to adjusting beam scanning velocity to improve sharpness in a raster scanning display such as a cathode ray tube (CRT) display.

BACKGROUND

The sharpness of a video display may be improved by varying the horizontal scanning rate of the beam in response to variations of the luminance component of the video signal. The luminance signal is differentiated and the differentiated luminance signal is used to generate a current for driving an auxiliary beam deflection element, for example, a scan velocity modulation (SVM) coil to modify the horizontal scanning rate so as to emphasize contrast between light and dark areas of the display. For example, at a transition from black to white in a given horizontal scan line, the beam scanning speed is increased approaching the transition, thus making the display relatively darker in the black area of the transition. Upon passing the transition into the white area, the beam speed is decreased such that the beam dwells relatively longer, making the display relatively brighter. The reverse occurs in passing from light to dark.

The SVM coil operates to add or subtract from the magnetic horizontal beam deflection field applied by the main horizontal deflection coils. The angle of beam deflection is a function of horizontal rate scanning current, generally a sawtooth current. The horizontal rate scanning current causes the beam to sweep across a horizontal raster line at a vertical position determined by a vertical rate sawtooth current, coupled to the vertical deflection coils.

The sawtooth scanning drive currents are adjusted to account for the fact that the display screen is substantially flat rather than spherical. A given amount of angular beam deflection produces a smaller linear horizontal displacement of the beam at the center of the flat screen and a greater amount at the edges of the screen, because the screen is relatively farther from the source of the beam when scanning at the edges of the screen than at the center of the screen.

It may be desirable to display on-screen-display (OSD) characters on the screen of the CRT. The SVM current is, typically, optimized for non-OSD visual content. Therefore, when OSD character is displayed on the CRT screen, the SVM current could, disadvantageously, even degrade picture sharpness for OSD visual content. In one prior art, circuitry is provided for selectively disabling normal SVM circuit operation during OSD operation.

It may be desirable to produce a waveform for the SVM current that is optimized for OSD display and for non-OSD display and to select dynamically the appropriate waveform. The selection may be changed on a region-by-region basis of the screen of the CRT, in accordance with the presence or absence of OSD visual content.

The extraction of high frequency components or picture edge content in the video signal via differentiation of the video signal may be obtained, for example, by using a high-pass filter. The high-pass filter filters out low frequency components from the video signal.

In carrying out an inventive feature, a signal indicative of the start and stop positions of OSD insertions in corresponding regions of the CRT screen is provided. The start and stop insertion position indicative signal dynamically varies the high-pass filter frequency response. Thereby, advantageously, different optimized SVM current waveforms are produced for OSD and for non-OSD visual content, respectively.

SUMMARY

In an arrangement embodying an inventive feature, a video signal provides, selectively, a first type of visual content and a second type of visual content. When each of the types of visual content is provided, horizontal scanning occurs at a first horizontal deflection frequency. A source of a first control signal has a first value, when the video signal provides the first type of visual content and a second value, when the video signal provides the second type of visual content. A filter is responsive to the first control signal for selectively establishing, in accordance therewith, a first frequency response characteristic and a second frequency response characteristic of the filter. The filter is responsive to the video signal for generating from the video signal a filtered, correction signal having a frequency spectrum that varies in accordance with the first control signal. Correction signal is coupled to a deflection field producing arrangement for varying, in accordance therewith, the deflection field.

DESCRIPTION OF THE PREFERRED EMBODIMENTS

Figure 1:
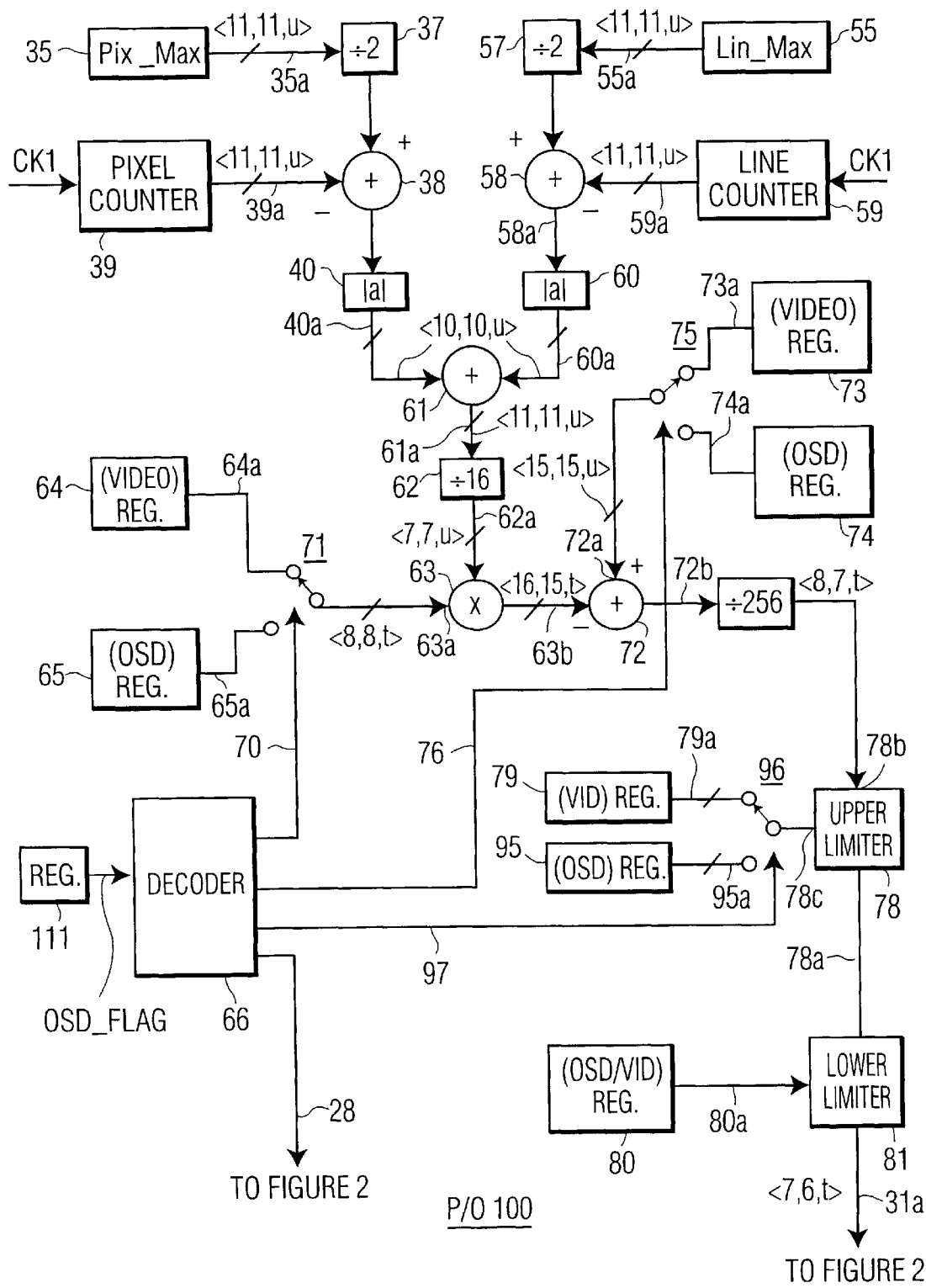
FIG. 1 illustrates in a block diagram a first portion of a circuit for generating a scan velocity modulation current, embodying an inventive feature.
Figure 2:
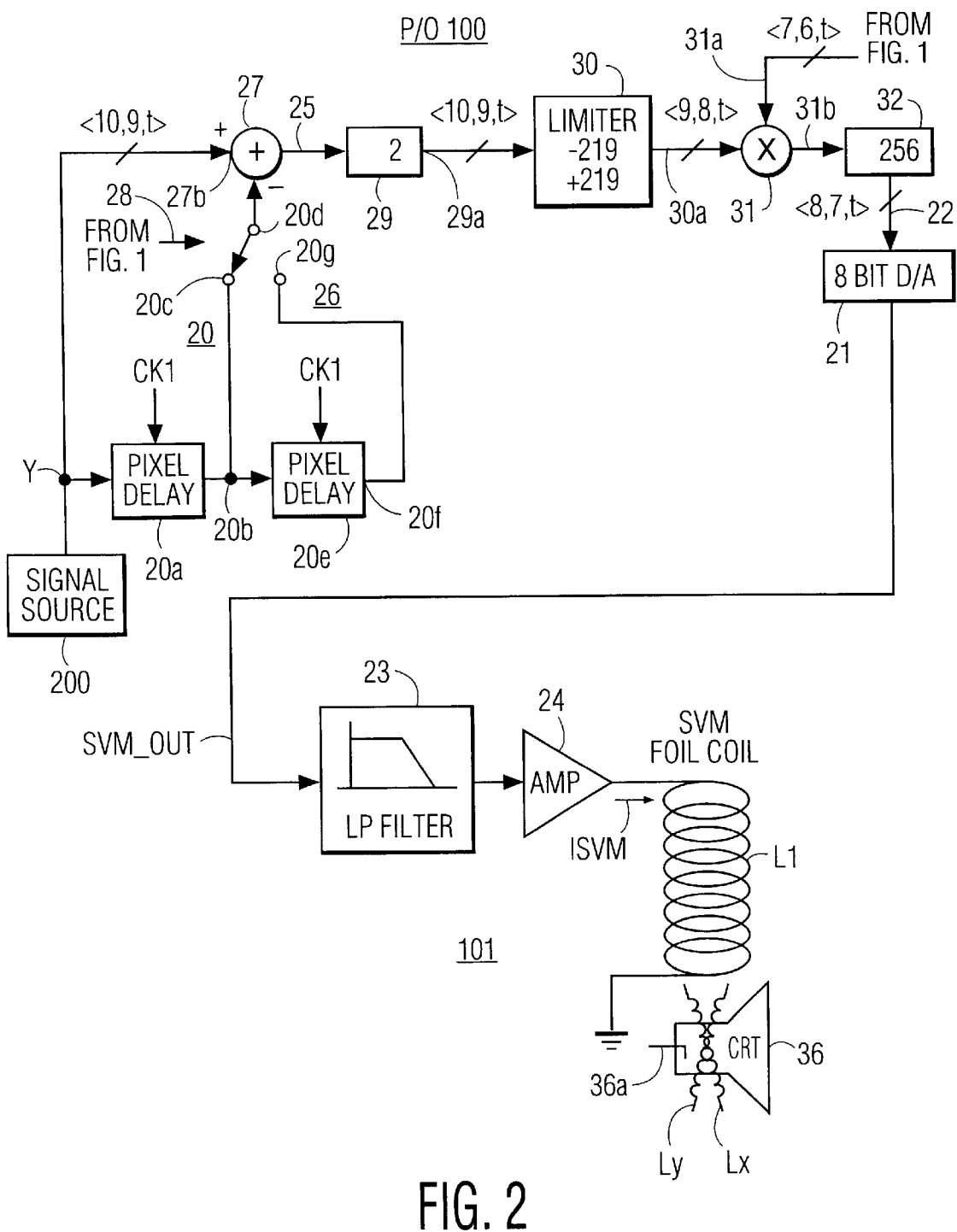
FIG. 2 illustrates partially in a block diagram a second portion of the scan velocity modulation current generating circuit, embodying an inventive feature.

A scan velocity modulation (SVM) current generating circuit 100 of FIGS. 1 and 2, embodying inventive features, generates from a luminance signal Y of FIG. 2 a picture enhancement or correction signal SVM_OUT. Similar symbols and numerals in FIGS. 1 and 2 indicate similar items or functions.

Signal SVM_OUT, produced in a digital-to-analog (D/A) converter 21, is coupled via a low-pass, reconstruction filter 23 and a conventional amplifier 24 to an SVM, auxiliary deflection winding or coil L1 for generating an SVM modulation current ISVM in coil L1 mounted on a cathode ray tube (CRT) 36. In addition to winding L1, a horizontal deflection winding Lx and a vertical deflection winding Ly are mounted on CRT 36 such that the three windings produce a deflection field having a horizontal component and a vertical component, in a known manner. An electrostatic type SVM device may be used, instead of coil L1, for an electrostatic type CRT. An auxiliary deflection field produced by coil L1 is used for adding to or subtracting from a horizontal deflection field produced by main horizontal deflection coils, not shown. Reconstruction filter 23 filters out high frequency components from signal SVM_OUT caused by the discrete quantization levels in signal SVM_OUT.

The impedance of coil L1 results in a significant group delay which may be compensated by introducing an additional delay, not shown, in a video path of a cathode video signal, not shown, of CRT 36. This insures that the video signal arrives at the CRT cathode at the same time the corresponding level of modulation current ISVM of FIG. 2 is developed in SVM coil L1.

Luminance or video signal Y of FIG. 2 is a digital signal provided as a sequence of words representing luminance or brightness information. The words of luminance signal Y are updated in synchronization with a clock signal CK1. Signal Y is obtained from a multi-standard signal source 200. Source 200 selectively generates signal Y from, for example, an analog luminance signal component of a baseband television signal, not shown, defined in accordance with a broadcasting standard, for example, NTSC, using conventional sampling techniques and displayed at a scan rate of 1H. Scan rate of 1H represents a horizontal rate that is approximately 16 KHz. Source 200 selectively generates signal Y from an NTSC signal, not shown, that is up-converted to a double scan rate of 2H. Additionally, source 200 selectively generates signal Y from a high definition or a standard definition video signal, not shown, that is defined in accordance with Advance Television System Committee (ATSC) standard. Source 200 selectively generates signal Y from a computer graphics video signal, not shown.

Signal Y, as well as other digital signals in FIGS. 1 and 2, maybe formatted as a fixed point number. The fixed point number has a fixed number of binary digits or bits and a fixed position for the decimal point with respect to that set of bits. A given fixed point number may, for example, be either an unsigned number that is always positive or a two's complement number.

Each fixed point number in FIGS. 1 and 2 has the following format:

<total_bits, integer_bits, sign_format>

The first item, total_bits, is the total number of bits used to represent the fixed-point value, including integer bits, fraction bits, and sign bit, if any. The second item, integer_bits, is the number of integer bits (the number of bits to the left of the binary point, excluding the sign bit, if any). The third item, sign_format, is a letter specifying the sign format. The letter "u" stands for an unsigned number and the letter "t" stands for a two's complement number. In the unsigned format there is no sign bit and, in the two's complement format, the leftmost bit is the sign bit. For example, the fixed point number, 0101 in binary, defined by the <4,2,t>format has the value of 2.5 in decimal.

In carrying out an inventive feature, luminance or video signal Y of FIG. 2 is coupled to a digital differentiator formed by a filter stage 20 operating as transversal or a comb filter, embodying an inventive feature. In filter stage 20, signal Y is delayed in a clocked delay element 20a by a delay time equal to a single period of clock signal CK1 to produce a delayed signal 20b. Delayed signal 20b is selectively coupled via a pair of terminals 20c and 20d of a selector switch 26 to an input terminal 27a of a subtractor 27, when a binary switch control signal 28 of switch 26 of FIG. 2 is at a first state.

Delayed signal 20b is further delayed in a clocked delay element 20e by a delay time equal to the single period of clock signal CK1 to produce a further delayed signal 20f. Further delayed signal 20f is selectively coupled, instead of signal 20b, via a terminal 20g and terminal 20d of selector switch 26 to input terminal 27a of subtractor 27, when switch control signal 28 is at a second state.

The state of signal 28 is determined in a decoder stage 66 of FIG. 1. Decoder stage 66 establishes the state of signal 28 in accordance with a state of a binary signal OSD_FLAG provided by, for example, a microprocessor or a video processor, not shown. Signal OSD_FLAG indicates start and stop pixel positions of the CRT screen within which an on-screen-display (OSD) character visual content is inserted, in a conventional manner. The term OSD character identifies herein also computer graphics or other picture scenes having sharp edge objects that may be processed with respect to SVM similarly to the way OSD character visual content is processed.

Signal OSD_FLAG is at one state in a region of the CRT screen, when the displayed pixel of signal Y contains OSD character visual content and at an opposite state in a region of the CRT screen, when the displayed pixel of signal Y contains non-OSD visual content. Non-OSD visual content is a scene typically obtained with a camera. Whereas, OSD visual content is typically obtained from a character generator included in, for example, a television receiver.

Signal Y of FIG. 2 is also coupled to an input 27b of subtractor 27. Subtractor 27 generates a filtered or differentiated signal 25 by subtracting the selected signal at terminal 27a from that at terminal 27b. Signal 25, containing a time-derivative, dY/dt, information of luminance signal Y provides information of a brightness transition or variation from light to dark or dark to light in a picture image produced by an electron beam in CRT 36. The time-derivative is obtained in filter stage 20 by passing in signal 25 high frequency components and filtering out low frequency components of signal Y. The transfer response of filter stage 20 is selected, in accordance with the frequency of clock signal CK1 and the state of control signal 28.

In carrying out an additional inventive feature, switch control signal 28 is at the first state for selecting single delay element 20a in filter stage 20, when signal Y containing OSD character visual content is obtained from the high definition ATSC video signal, not shown, or from computer graphics video signal, not shown. Switch control signal 28 is at the second state, selecting both delay elements 20a and 20e in stage 20, when signal Y is obtained from an NTSC video signal, not shown, containing non-OSD visual content and when signal Y is obtained from the standard definition ATSC video signal, not shown. However, in another example, depending on the visual content, it may be desirable to have control signal 28 at the second state, instead, when signal Y is obtained from the high definition ATSC video signal.

The frequency of clock signal CK1 is selected by the microprocessor, not shown. When signal Y is obtained from the NTSC video signal, not shown, the frequency of signal CK1 is 27 Mhz. On the other hand, when signal Y is obtained from any of the ATSC, the computer graphics and the NTSC video signals, not shown, that are up-converted for adaptation to display at scan rate of 2H, the frequency of signal CK1 is 81 Mhz.

Consequently, the transfer response of filter stage 20 for signal Y, obtained from NTSC video signal containing non-OSD visual content and displayed at the scan rate of 1H, is 6 dB per octave up to a frequency of 6.75 Mhz. The transfer response of filter stage 20 for non-OSD signal Y obtained from NTSC, up-converted to scan rate of 2H video signal or signal Y obtained from ATSC video signal is 6 dB per octave up to a frequency of 13.5 Mhz. The transfer response of filter stage 20 for signal Y obtained from an ATSC high definition video signal is 6 dB per octave up to 20.25 Mhz.

Figure 3:
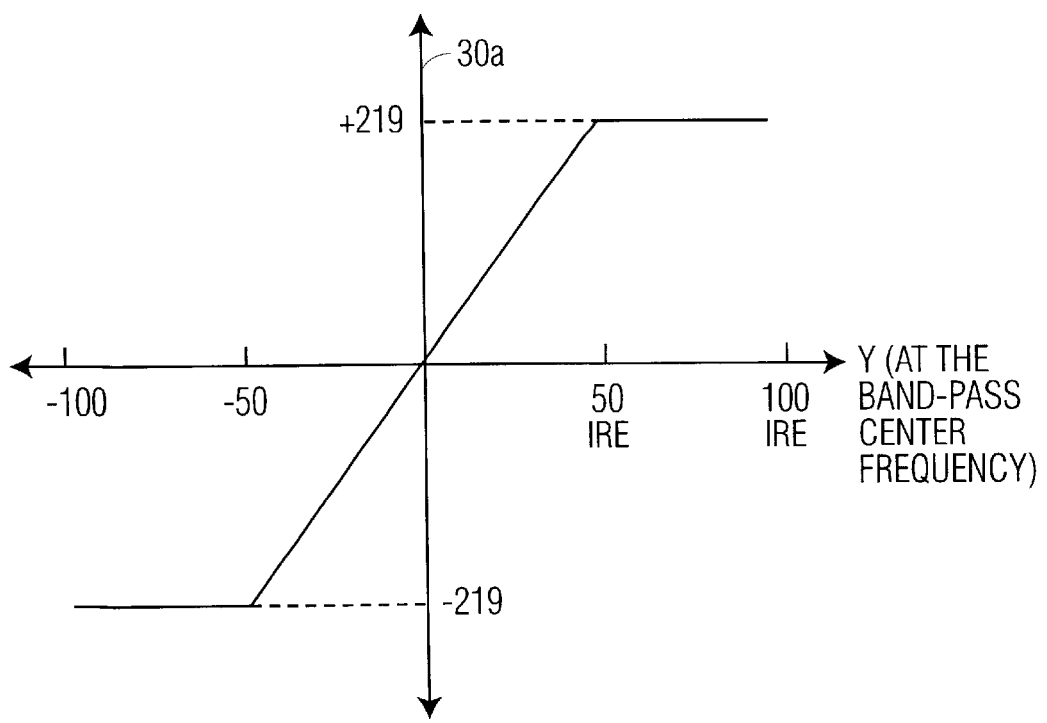
FIG. 3 illustrates a graph for explaining the operation of a limiter included in the circuit of FIG. 2.

Differentiated or high-pass filtered signal 25 is coupled via a conventional divide-by-2 scaler stage 29 for generating a signal 29a that is coupled to a limiter stage 30 for generating a signal 30a. As shown in an SVM transfer curve of FIG. 3, the value of signal 30a varies generally linearly with that of signal Y from a limit of, for example, plus 219, when the numerical value of signal Y is positive, to a limit of minus 219, when the numerical value of signal Y is negative. Similar symbols and numerals in FIGS. 1, 2 and 3 indicate similar items or functions. These limits are selected to limit a component of signal 30a, when signal Y is at a frequency in which the transfer response of filter stage 20 is at a maximum. At the limit value, signal 30a yields maximum SVM output.

A modulation multiplier 31 receives signal 30a and a modulation control signal 31a for generating an SVM level indicative signal 31b by multiplication. Signal 31a is indicative of the beam position on the screen of CRT 36, as described later on.

Signal 31b is coupled via a conventional divide-by-256 scaler stage 32 for generating an SVM level indicative signal 22. Signal 22 is coupled to an input of digital-to-analog (D/A) converter 21 that produces analog signal SVM_OUT, referred to before, in accordance with the value of each word of signal 22. Thus, signal SVM_OUT has discrete quantization levels in accordance with the values of the sequence of words of digital signal 22.

Signal 31a causes modulation current ISVM of FIG. 2 to vary in accordance with the beam spot position on the screen. Control signal 31a is generated in the portion of circuit 100 of FIG. 1, described next.

A register 35 containing a signal 35a provided by the microprocessor, not shown, is representative of the total number of pixels in a given horizontal line of the CRT. Signal 35a is coupled via a divide-by-2 scaler stage 37 to an input of a subtractor 38. A counter 39 counts at the rate of clock signal CK1. Counter 39 generates a signal 39a representative of a currently displayed pixel. Signal 39a is coupled to an input of subtractor 38 and is subtracted there.

During the horizontal line, an output signal 38a of subtractor varies from a positive value, representative one half of the total number of pixels in the horizontal line, to a negative value, representative one half of the total number of pixels. The value of output signal 38a crosses a zero value when the electron beam is at the center of the horizontal line. Signal 38a is coupled to an absolute value producing stage 40 that produces a signal 40a containing the absolute value of signal 38a. During the horizontal line, output signal 40a varies from a positive value, representative one half of the total number of pixels, and reaches the zero value at the center of the horizontal line. Thereafter, signal 40a varies from zero to the positive value, representative one half of the total number of pixels. Thus, signal 40a is analogous to a horizontal rate, triangular shaped analog waveform having a peak value at the center of the horizontal line. The frequency of signal 40a is determined in accordance with the scan rate, for example, 1H or 2H.

Similarly, a register 55 of FIG. 1 containing a signal 55a provided by the microprocessor, not shown, is representative of the total number of horizontal lines in the raster of the CRT. Signal 55a is coupled via a divide-by-2 scaler stage 57 to an input of a subtractor 58. A line counter 59 generates a signal 59a representative of the horizontal line that is currently displayed on the CRT. Signal 59a is coupled to an input of subtractor 58 and is subtracted there. During a vertical sweep of the CRT, an output signal 58a of subtractor 58 varies from a positive value, representative one half of the total number of lines, to a negative value, representative one half of the total number of lines. The value of output signal 58a crosses the zero value when the electron beam is at the vertical center of the raster. Signal 58a is coupled to an absolute value producing stage 60 that produces a signal 60a containing the absolute value of signal 58a. During the vertical sweep, output signal 60a varies from a positive value, representative one half of the total number of lines and reaches the zero value at the vertical center of the raster. Thereafter, signal 60a varies from zero to a positive value, representative one half of the total number of lines. Thus, signal 60a is analogous to a vertical rate triangular shaped analog waveform having a peak value at the center of the vertical scan.

When signal Y is displayed at the scan rate of 1H, the values of signals 35a and 55a are, illustratively, established at 640 and 480, respectively. Otherwise, the values of signals 35a and 55a are, illustratively, established at 1920 and 1080, respectively.

Horizontal rate signal 40a and vertical rate signal 60a are coupled to an adder 61 for producing a sum signal 61a. Signal 61a is analogous to a horizontal rate, triangular shaped analog waveform having a peak at the center of the horizontal scan and being superimposed on a vertical rate triangular shaped analog waveform. The triangular shaped analog waveform has a peak at the center of the vertical scan. Signal 61a is coupled via a divide-by-16 scaler stage 62. Stage 62 produces a signal 62a that is coupled to an input of a slope control multiplier 63.

Advantageously, a register 64 produces a signal 64a having a value of, for example, 240 that is provided by the microprocessor, not shown. Signal 64a providing gain or slope information of SVM control signal is used when signal Y of FIG. 2 contains non-OSD visual content. A register 65 of FIG. 1 produces a signal 65a having a value of, for example, 120 that is provided by the microprocessor, not shown. Signal 65a providing gain or slope control is used when signal Y of FIG. 2 contains OSD character visual content.

Signal 65a of FIG. 1 is coupled via a selector switch 71 to an input 63a of multiplier 63, when a switch control signal 70 of switch 71 is at a first state. Signal 64a is coupled via selector switch 71 to input 63a of multiplier 63, when switch control signal 70 of switch 71 is at a second state. Similarly to signal 28, discussed before, the state of signal 70 is determined in decoder stage 66. Decoder stage 66 establishes the state of signal 70 in accordance with a state of signal OSD_FLAG. Switch control signal 70 is at the first state, when signal Y contains OSD character visual content, and at the second state, when signal Y contains non-OSD visual content. The state of signal 70 varies, in accordance with signal 70, at different regions of the CRT screen.

Multiplier 63 is analogous to an analog amplifier having a variable gain selectively controlled by the parameters contained in signals 64a and 65a, respectively. Multiplier 63 produces an output signal 63b that is coupled to an input of a subtractor 72 and is subtracted there.

Advantageously, a register 73 produces a signal 73a having a value of, for example, 20160 that is provided by the microprocessor, not shown. Signal 73a providing level shifting information is used when signal Y of FIG. 2 contains non-OSD visual content. A register 74 of FIG. 1 produces a signal 74a having a value of, for example, 10,080. Signal 74a provides level shifting control, when signal Y of FIG. 2 contains OSD character visual content.

Signal 74a of FIG. 1 is coupled via a selector switch 75 to an input 72a of subtractor 72, when a switch control signal 76 of switch 75 is at a first state. Signal 73a is coupled via selector switch 75 to input 72a of subtractor 72, when a switch control signal 76 of switch 75 is at a second state. Similarly to signals 28 and 70, discussed before, the state of signal 76 is determined in decoder stage 66. Decoder stage 66 establishes the state of signal 76 in accordance with a state of signal OSD_FLAG. For example, switch control signal 76 may be at the first state, when signal Y of FIG. 2 contains OSD character visual content, and at the second state, when signal Y contains non-OSD visual content. Subtractor 72 of FIG. 1 produces an output signal 72b and is analogous to a variable analog level shifter selectively controlled by the values of signals 73a and 74a, respectively. Advantageoulsy, signal 72b is coupled via a divide-by-256 scaler stage 77 to an input 78b of a conventional upper limiter 78 that produces an output signal 78a.

Advantageously, a register 79 produces a signal 79a having a value of, for example, 63 that is provided by the microprocessor, not shown. Signal 79a providing an upper limit value of signal 78a is used when signal Y of FIG. 2 contains non-OSD visual content. A register 95 of FIG. 1 produces a signal 95a having a value of, for example, 31 that is provided by the microprocessor, not shown. Signal 95a providing an upper limit value of signal 78a is used when signal Y of FIG. 2 contains OSD character visual content.

Signal 95a of FIG. 1 is coupled via a selector switch 96 to an input 78c of limiter 78, when a switch control signal 97 of witch 96 is at a first state. Signal 79a is coupled via selector switch 96 to input 78c of limiter 78, when switch control signal 97 of switch 96 is at a second state. Similarly to signal 28, discussed before, the state of signal 97 is determined in decoder stage 66. Decoder stage 66 establishes the state of signal 97 in accordance with a state of signal OSD_FLAG. Switch control signal 97 is at the first state, when signal Y of FIG. 2 contains OSD character visual content, and at the second state, when signal Y contains non-OSD visual content. Signal 97 may have different states when the electron beam is at different regions of the CRT screen.

When the value of divide-by-256 signal 72b is smaller than the upper limit value determined by the signal at terminal 78c of limiter 78, a change in signal 72b produces a corresponding change in signal 78a. On the other hand, when the value of divide-by-256 signal 72b is equal to or greater than the upper limit value determined by the signal at terminal 78c of limiter 78, the value of signal 78a remains constant at the upper limit. Thus, limiter 78 is analogous to an analog signal clipping stage.

Signal 78a is coupled to an input of a conventional lower limiter 81 that produces modulating, gain control signal 31a, mentioned before. A register 80 generates a signal 80a having a value of, for example, 0. Signal 80a containing a lower limit value is coupled to limiter 81 for establishing the lower limit value of signal 31a. When the value of signal 78a is larger than the lower limit value determined by signal 80a, a change in signal 78a produces a corresponding change in signal 31a. On the other hand, when the value of signal 78a is equal to or smaller than the lower limit value determined by signal 80a, the value of signal 31a remains constant at the lower limit.

Figure 4:
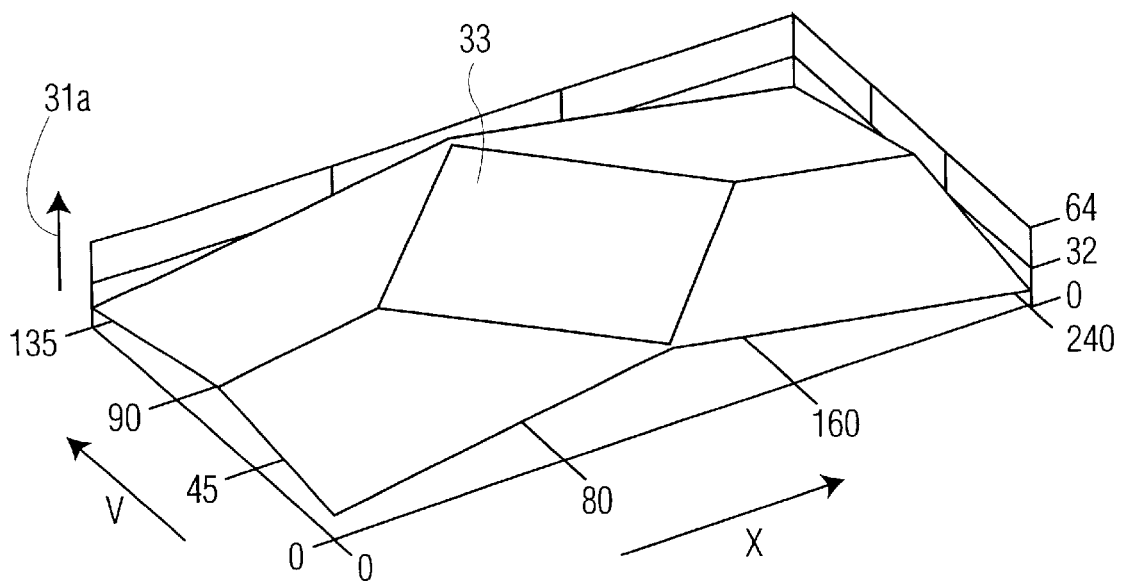
FIG. 4 illustrates a graph for explaining a waveform generated in the circuit of FIG. 1.

FIG. 4 illustrates in a two dimensional graphical diagram the variations of the value of signal 31a of FIG. 1 as a function of a horizontal position X of FIG. 4 and as a function of a vertical position V of the beam spot on the face of the CRT. Similar symbols and numerals in FIGS. 1, 2, 3 and 4 indicate similar items or functions.

In FIG. 4, the picture width for a given size of the CRT screen is normalized to be in a range of values between 0 and 240 and the picture height to be in a range of values between 0 and 135, representing a 4:3 aspect ratio. The value of signal 31a varies, in accordance with the coordinates X and V, represented by a two dimensional surface 34. Surface 34 represents an approximation of a two dimensional parabola surface. The range of values of signal 31a change within the range that cannot exceed the limits, 0 to 64. A flat portion 33 of surface 34 forms a diamond. Portion 33 illustrates the level of signal 31a, during a portion of the cycle, when upper limiter 78 of FIG. 1 provides limiting operation.

In accordance with an inventive feature, limiter 78 causes the value of signal 78a to remain constant at the upper limit. The rest of surface 34 of FIG. 4 slopes downwards from crest portion 33. The minimum value of signal 31a cannot be smaller than the lower limit established by lower limiter 81 of FIG. 1. Thus, lower limiter 81 establishes the minimum value and upper limiter 78 establishes the maximum value of signal 31a. The slope of surface 35 representing signal 31a of FIG. 4 outside portion 33 is controlled by the signal at terminal 63a of multiplier 63. As explained before, signal 31a is applied to modulator or multiplier 31 of FIG. 2 for generating modulation control signal 31b.

What is claimed is:

1. A video display deflection apparatus, comprising:
   means for producing a deflection field that varies a position of an electron beam on a screen of a cathode ray tube to form horizontal lines of a raster:
   a source of a video signal for displaying picture information contained in said video signal in said horizontal lines, said video signal providing, selectively, a first type of visual content and a second type of visual content, such that, when each of said types of visual content is provided, horizontal scanning occurs at a first horizontal deflection frequency;
   a source of a first control signal having a first value, when said video signal provides said first type of visual content and a second value, when said video signal provides said second type of visual content; and
   a filter responsive to said first control signal for selectively establishing by an operation of a switch a first frequency response characteristic, when said first control signal has said first value, and a second frequency response characteristic of said filter, when said first control signal has said second value, said filter being responsive to said video signal for generating from said video signal a filtered, correction signal having a frequency spectrum that varies in accordance with said first control signal, said correction signal being coupled to said deflection field producing means for varying, in accordance therewith, said deflection field.

2. A video display deflection apparatus according to claim 1, wherein said filter comprises a transversal filter having, selectively, a first delay element, when said first control signal is at said first value and a second delay element, when said first control signal is at said second value.

3. A video display deflection apparatus according to claim 1, wherein said correction signal is coupled to said deflection field producing means to produce, in accordance therewith, scan velocity modulated deflection of said electron beam.

4. A video display deflection apparatus according to claim 1 wherein said filter is responsive to a clock signal and to said video signal for producing said correction signal having a sequence of states.

5. A video display deflection apparatus according to claim 4, wherein said deflection field producing means selectively operates in a range of deflection frequencies and wherein when a first deflection frequency of said deflection field is selected, a corresponding frequency of said clock signal is selected and when a second deflection frequency of said deflection field is selected, a different frequency of said clock signal is selected in a manner to provide for multi-mode operation.

6. A video display deflection apparatus, comprising:

means for producing a deflection field that varies a position of an electron beam on a screen of a cathode ray tube;

a source of a video signal for displaying picture information contained in said video signal in said screen of said cathode ray tube;

a source of a first control signal having a first value, when said electron beam is at a first region of said screen and a second value, when said electron beam is at a second region of said screen; and a filter responsive to said first control signal for selectively establishing by an operation of a switch a first frequency response characteristic of said filter, when said first control signal has said first value, and a second frequency response characteristic of said filter, when said first control signal has said second value, said filter being responsive to said video signal for generating from said video signal a filtered correction signal having a frequency spectrum that varies in accordance with said first control signal, said correction signal being coupled to said deflection field producing means for varying, in accordance therewith, said deflection field.

7. A video display deflection apparatus according to claim 6, wherein said correction signal is coupled to said deflection field producing means to produce, in accordance therewith, scan velocity modulated deflection of said electron beam.

8. A video display deflection apparatus, comprising:

means for producing a deflection field that varies a position of an electron beam on a screen of a cathode ray tube;

a source of a video signal for displaying picture information contained in said video signal in said screen of said cathode ray tube;

a source of a first control signal having a first value that is indicative when a first mode of display operation is required and having a second value that is indicative when a second mode of displayed operation is required; and a transversal filter responsive to said first control signal having, selectively, a first delay element, when said first control signal is at said first value and a second delay element, when said first control signal is at said second value for selectively establishing, in accordance with said first value, a first frequency response characteristic of said filter and, in accordance with said second value, a second frequency response characteristic of said filter, said filter being responsive to said video signal for generating from said video signal a filtered, correction signal having a frequency spectrum that varies in accordance with the values of said first control signal, said correction signal being coupled to said deflection field producing means for varying, in accordance therewith, said deflection field.

9. A video display deflection apparatus according to claim 8, wherein said correction signal is coupled to said deflection field producing means to produce, in accordance therewith, scan velocity modulated deflection of said electron beam.

10. A video display deflection apparatus, comprising:

means for producing a deflection field that varies a position of an electron beam on a screen of a cathode ray tube in a horizontal direction at a horizontal deflection frequency to produce horizontal scanning and in a vertical direction to produce vertical scanning at a vertical deflection frequency;

a source of a video signal for displaying picture information contained in said video signal in said screen of said cathode ray tube; and a clocked, transversal filter responsive to a clock signal and to said video signal for producing a binary, correction signal having a sequence that is indicative of picture image brightness variation, said correction signal being coupled to said deflection field producing means to produce, in accordance therewith, scan velocity modulated deflection of said electron beam.

11. A video display deflection apparatus according to claim 10, wherein said deflection field producing means selectively operates in a range of deflection frequencies, wherein when a first deflection frequency of said deflection field is selected, a corresponding frequency of said clock signal is selected and when a second deflection frequency of said deflection field is selected, a different frequency of said clock signal is selected in a manner to provide for multimode operation and wherein said filter comprises a clocked delay element responsive to said clock signal for varying a delay of said delay element in accordance with the frequency of said clock signal.

12. A video display deflection apparatus, comprising:

means for producing a deflection field that varies a position of an electron beam on a screen of a cathode ray tube;

a source of a video signal for displaying picture information contained in said video signal in said screen of said cathode ray tube; and a filter responsive to a clock signal and to said video signal for generating a binary, filtered signal having states that vary in accordance with said video signal, said filtered signal being coupled to said deflection field producing means to produce scan velocity modulated deflection of said electron beam.

13. A video display deflection apparatus according to claim 12 further comprising, a source of a first signal that varies in accordance with the position of said beam on said screen and means for combining said filtered and first signals for generating a correction signal that is coupled to an auxiliary winding to provide scan velocity modulated deflection of said electron beam.

14. A video display deflection apparatus according to claim 12, wherein said deflection field producing means selectively operates in a range of deflection frequencies, wherein when a first deflection frequency of said deflection field is selected, a corresponding frequency of said clock signal is selected and when a second deflection frequency of said deflection field is selected, a different frequency of said clock signal is selected in a manner to provide for multimode operation and wherein said filter comprises a clocked delay element responsive to said clock signal for varying a delay of said delay element in accordance with the frequency of said clock signal.

15. A video display deflection apparatus according to claim 12, further comprising, a source of a control signal having a first value, when said video signal provides a first type of visual content and a second value, when said video signal provides a second type of visual content, said control signal being coupled to said filter for selectively establishing, in accordance therewith, a first frequency response characteristic and a second frequency response characteristic of said filter, said filter being responsive to said video signal for generating from said video signal said filtered signal having a frequency spectrum that varies in accordance with said control signal.

16. A video display deflection apparatus according to claim 12, wherein said filtered signal is coupled to an auxiliary winding to produce scan velocity modulated deflection of said electron beam.

* * * * *